(12) United States Patent
Cho et al.

(10) Patent No.: US 11,999,879 B2
(45) Date of Patent: *Jun. 4, 2024

(54) ADHESIVE FILM AND DISPLAY MEMBER COMPRISING THE SAME

(71) Applicants: SAMSUNG SDI CO., LTD., Yongin-si (KR); SAMSUNG ELECTRONICS CO., LTD., Suwon-si (KR)

(72) Inventors: Ik Hwan Cho, Suwon-si (KR); Ji Ho Kim, Suwon-si (KR); Jee Hee Kim, Suwon-si (KR); Ji Won Kang, Suwon-si (KR); Byeong Do Kwak, Suwon-si (KR); Yong Tae Kim, Suwon-si (KR); Il Jin Kim, Suwon-si (KR); Sung Hyun Mun, Suwon-si (KR); Hyung Rang Moon, Suwon-si (KR); Seon Hee Shin, Suwon-si (KR); Gwang Hwan Lee, Suwon-si (KR); Woo Jin Lee, Suwon-si (KR); Jae Hyun Han, Suwon-si (KR)

(73) Assignees: Samsung SDI Co., Ltd., Yongin-si (KR); Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,155

(22) Filed: Oct. 12, 2020

(65) Prior Publication Data

US 2021/0032512 A1    Feb. 4, 2021

Related U.S. Application Data

(62) Division of application No. 15/198,977, filed on Jun. 30, 2016, now Pat. No. 10,829,671.

(30) Foreign Application Priority Data

Jun. 30, 2015  (KR) .......................... 10-2015-0093811

(51) Int. Cl.
C09J 133/08    (2006.01)
C09J 7/10      (2018.01)

(52) U.S. Cl.
CPC .............. *C09J 133/08* (2013.01); *C09J 7/10* (2018.01); *C09J 2203/318* (2013.01); *C09J 2301/312* (2020.08); *C09J 2301/408* (2020.08); *C09J 2433/00* (2013.01)

(58) Field of Classification Search
None
See application file for complete search history.

(56) References Cited

U.S. PATENT DOCUMENTS

| | | |
|---|---|---|
| 5,162,432 A | 11/1992 | Machado |
| 6,291,593 B1 | 9/2001 | Cheng |
| 6,771,335 B2 | 8/2004 | Kimura et al. |
| 10,745,597 B2 | 8/2020 | Kim et al. |
| 2001/0021452 A1 | 9/2001 | Kishioka et al. |
| 2002/0142158 A1 | 10/2002 | Ono et al. |
| 2002/0193487 A1 | 12/2002 | Sakurai et al. |
| 2005/0154140 A1 | 7/2005 | Hong et al. |
| 2005/0181148 A1 | 8/2005 | Kim et al. |
| 2006/0035076 A1 | 2/2006 | Kim et al. |
| 2007/0149715 A1 | 6/2007 | Lee et al. |
| 2009/0179035 A1 | 7/2009 | Agarwal et al. |
| 2009/0298969 A1 | 12/2009 | Attarwala et al. |
| 2010/0209703 A1 | 8/2010 | Takarada et al. |
| 2012/0100359 A1 | 4/2012 | Kishioka et al. |
| 2012/0329970 A1 | 12/2012 | Kishioka et al. |
| 2013/0040123 A1 | 2/2013 | Cho et al. |
| 2013/0052457 A1 | 2/2013 | Inui et al. |
| 2013/0236674 A1 | 9/2013 | Kim et al. |
| 2014/0016067 A1 | 1/2014 | Yoon et al. |
| 2014/0065416 A1 | 3/2014 | Niwa et al. |
| 2014/0139447 A1 | 5/2014 | Kang et al. |
| 2014/0162044 A1 | 6/2014 | Lee et al. |
| 2014/0162057 A1 | 6/2014 | Cho et al. |
| 2014/0267950 A1 | 9/2014 | Kang et al. |
| 2015/0367602 A1* | 12/2015 | Iwaya ..................... B32B 27/08 428/522 |
| 2016/0122600 A1 | 5/2016 | Moon et al. |
| 2016/0177146 A1 | 6/2016 | Mun et al. |
| 2017/0002237 A1 | 1/2017 | Cho et al. |
| 2017/0015880 A1 | 1/2017 | Kim et al. |
| 2022/0177735 A1 | 6/2022 | Kim et al. |

FOREIGN PATENT DOCUMENTS

| | | |
|---|---|---|
| CN | 1763112 A | 4/2006 |
| CN | 1764679 A | 4/2006 |
| CN | 101679709 A | 3/2010 |

(Continued)

OTHER PUBLICATIONS

Machine translation of WO 2014 091927 A1. (Year: 2014).
U.S. Final Office Action dated Jun. 11, 2021, issued in U.S. Appl. No. 16/942,678 (13 pages).
U.S. Office Action dated Jun. 23, 2021, issued in U.S. Appl. No. 16/933,853, (23 pages).
TIPO Office action dated Dec. 7, 2016, corresponding to Taiwanese Patent Application No. 105110178 (13 pages).
KIPO Office Action dated Dec. 13, 2016, corresponding to Korean Patent Application No. 10-2015-0045770 (7 pages).

(Continued)

*Primary Examiner* — Cheng Yuan Huang (74) *Attorney, Agent, or Firm* — Lewis Roca Rothgerber Christie LLP (57) ABSTRACT

An adhesive film and a display member including the same are disclosed. The adhesive film is formed of an adhesive composition including: a copolymer of a monomer mixture including a hydroxyl group-containing (meth)acrylate and a comonomer; and nanoparticles. The adhesive film has a creep at −20° C. of about 50 μm to about 100 μm and a gel fraction of about 50% to about 75%.

11 Claims, 1 Drawing Sheet

(56) References Cited

FOREIGN PATENT DOCUMENTS

| | | | |
|---|---|---|---|
| CN | 102585721 A | 7/2012 |
| CN | 102753635 A | 10/2012 |
| CN | 102855822 A | 1/2013 |
| CN | 102933677 A | 2/2013 |
| CN | 103160217 | 6/2013 |
| CN | 103328526 A | 9/2013 |
| CN | 103865411 A | 6/2014 |
| CN | 103897620 A | 7/2014 |
| CN | 104231952 A | 12/2014 |
| CN | 106010318 A | 10/2016 |
| JP | H09-278837 A | 10/1997 |
| JP | 2002-348546 A | 12/2002 |
| JP | 2006-301572 A | 11/2006 |
| JP | 2007-176542 A | 7/2007 |
| JP | 2008-037101 A | 2/2008 |
| JP | 4750410 B2 | 8/2011 |
| JP | 2012-128391 A | 7/2012 |
| KR | 10-2005-0056158 A | 6/2005 |
| KR | 10-2007-0055363 A | 5/2007 |
| KR | 10-2008-0052897 A | 6/2008 |
| KR | 10-2010-0002638 A | 1/2010 |
| KR | 10-2010-0075726 A | 7/2010 |
| KR | 10-2010-0105984 A | 10/2010 |
| KR | 10-2012-0125699 A | 11/2012 |
| KR | 10-2014-0076425 A | 6/2014 |
| KR | 10-2014-0085259 A | 7/2014 |
| KR | 10-2014-0085299 A | 7/2014 |
| KR | 10-2014-0090737 A | 7/2014 |
| KR | 10-2014-0102132 A | 8/2014 |
| KR | 10-2014-0111884 A | 9/2014 |
| KR | 10-2014-0148278 A | 12/2014 |
| KR | 10-2016-0030235 A | 3/2016 |
| TW | 200724635 A | 7/2007 |
| TW | 201300474 A1 | 1/2013 |
| TW | 201300478 A | 1/2013 |
| TW | 201420715 A | 6/2014 |
| TW | 201430085 A | 8/2014 |
| TW | 201430091 A | 8/2014 |
| WO | WO 2012/124908 A2 | 9/2012 |
| WO | WO 2012/138030 A1 | 10/2012 |
| WO | WO 2013/176364 A1 | 11/2013 |
| WO | WO 2014/027788 A1 | 2/2014 |
| WO | 2014/091927 A1 | 6/2014 |
| WO | WO 2014/091927 A1 | 6/2014 |
| WO | WO 2015/155844 A1 | 10/2015 |

OTHER PUBLICATIONS

U.S. Office Action dated May 17, 2017, issued in cross-reference U.S. Appl. No. 15/084,361 (17 pages).
U.S. Office Action dated May 19, 2017, issued in cross-reference U.S. Appl. No. 14/973,312 (19 pages).
Korean Office Action from corresponding Korean Application No. 10-2015-0093811, Korean Office action dated May 22, 2017 (8 pgs.).
Office action in related U.S. Appl. No. 15/084,361, filed Mar. 29, 2016, inventor Seon Hee Shin, et al. entitled "Adhesive Film and Display Member Comprising the Same", Office action dated Sep. 27, 2017 (20 pgs.).
Chinese Office Action dated Jun. 4, 2018, corresponding to Chinese Patent Application No. 201610191474.8 (9 pages).
Office action in corresponding Chinese Patent Application No. 201610491631.7, China Office action dated Nov. 2, 2018 (11 pgs.).
Taiwan Office action dated Sep. 9, 2016, corresponding to Taiwanese Patent Application No. 104135962 (7 pages).
Chinese Office Action dated Dec. 18, 2017 in corresponding Chinese Patent Application No. 201510729509.4 (9 pages).
U.S. Office Action dated Mar. 5, 2018, issued in U.S. Appl. No. 14/976,408 (18 pages).
U.S. Final Office Action dated Oct. 4, 2018, issued in U.S. Appl. No. 14/929,160 (11 pages).
U.S. Office Action dated Oct. 17, 2018, issued in U.S. Appl. No. 15/491,699 (10 pages).
Korean Office Action dated Jan. 28, 2019, corresponding to Korean Patent Application No. 10-2016-0170837 (5 pgs.).
International Search Report for corresponding PCT Application No. PCT/KR2015/011603, dated Mar. 31, 2016, with English Translation (4 pages).
Written Opinion for corresponding PCT Application No. PCT/KR2015/011603, dated Mar. 31, 2016, with English Translation (5 pages).
European Search Report for corresponding European Application No. 15854252.2, European Search Report dated May 14, 2018 (14 pgs.).
U.S. Office Action dated Jul. 26, 2017, issued in U.S. Appl. No. 14/923,520 (10 pages).
U.S. Office Action dated May 16, 2018, issued in U.S. Appl. No. 14/923,520 (7 pages).
U.S. Office Action dated Mar. 22, 2019, issued in U.S. Appl. No. 15/522,253 (22 pages).
Chinese Office Action dated Jul. 2, 2019, corresponding to Chinese Application No. 2015-80058757.9, (9 pages).
Chinese Office Action, with English translation, dated Oct. 12, 2019, corresponding to Chinese Patent Application No. 201710269050.3 (17 pages).
U.S. Restriction Requirement dated Dec. 22, 2020, issued in U.S. Appl. No. 16/942,678 (6 pages).
U.S. Office Action dated Feb. 22, 2021, issued in U.S. Appl. No. 16/942,678 (15 pages).
U.S. Office Action dated Dec. 7, 2021, issued in U.S. Appl. No. 16/942,678 (14 pages).
Taiwan Office action dated Aug. 9, 2017 in corresponding Taiwan Application No. 105120402 with English Summary of the Office Action (10 pages).
U.S. Advisory Action dated Aug. 23, 2021, issued in U.S. Appl. No. 16/942,678 (5 pages).
Advisory Action for U.S. Appl. No. 14/929,160 dated Aug. 30, 2019, 3 pages.
Advisory Action for U.S. Appl. No. 14/929,160 dated Dec. 17, 2018, 3 pages.
Advisory Action for U.S. Appl. No. 14/929,160 dated Sep. 14, 2018, 3 pages.
Advisory Action for U.S. Appl. No. 15/084,361 dated Jul. 14, 2020, 6 pages.
Advisory Action for U.S. Appl. No. 15/084,361 dated Jun. 28, 2018, 8 pages.
Advisory Action for U.S. Appl. No. 15/198,977 dated Jan. 17, 2018, 5 pages.
Advisory Action for U.S. Appl. No. 15/198,977 dated Mar. 29, 2019, 3 pages.
Advisory Action for U.S. Appl. No. 15/491,699 dated May 3, 2019, 3 pages.
Final Office Action for U.S. Appl. No. 14/929,160 dated Jul. 6, 2018, 8 pages.
Final Office Action for U.S. Appl. No. 14/929,160 dated Jun. 18, 2019, 10 pages.
Final Office Action for U.S. Appl. No. 14/976,408 dated Aug. 27, 2018, 14 pages.
Final Office Action for U.S. Appl. No. 15/084,361 dated Apr. 16, 2018, 23 pages.
Final Office Action for U.S. Appl. No. 15/084,361 dated Apr. 29, 2020, 23 pages.
Final Office Action for U.S. Appl. No. 15/084,361 dated Mar. 21, 2019, 21 pages.
Final Office Action for U.S. Appl. No. 15/198,977 dated Apr. 22, 2020, 10 pages.
Final Office Action for U.S. Appl. No. 15/198,977 dated Jan. 17, 2019, 25 pages.
Final Office Action for U.S. Appl. No. 15/198,977 dated Sep. 28, 2017, 10 pages.
Final Office Action for U.S. Appl. No. 15/491,699 dated Feb. 26, 2019, 8 pages.
Final Office Action for U.S. Appl. No. 15/491,699 dated Nov. 21, 2019, 9 pages.

(56) References Cited

OTHER PUBLICATIONS

Final Office Action for U.S. Appl. No. 16/933,853 dated Apr. 12, 2022, 30 pages.
Final Office Action for U.S. Appl. No. 16/942,678 dated Mar. 28, 2022, 14 pages.
Notice of Allowance for U.S. Appl. No. 14/929,160 dated Apr. 14, 2020, 8 pages.
Notice of Allowance for U.S. Appl. No. 15/198,977 dated Jul. 9, 2020, 8 pages.
Notice of Allowance for U.S. Appl. No. 15/491,699 dated Feb. 5, 2020, 8 pages.
Notice of Allowance for U.S. Appl. No. 15/522,253 dated Jan. 30, 2020, 7 pages.
Notice of Allowance for U.S. Appl. No. 15/522,253 dated Oct. 18, 2019, 10 pages.
Office Action for U.S. Appl. No. 14/929,160 dated Jan. 31, 2019, 9 pages.
Office Action for U.S. Appl. No. 14/929,160 dated Nov. 24, 2017, 9 pages.
Office Action for U.S. Appl. No. 14/929,160 dated Nov. 15, 2019, 12 pages.
Office Action for U.S. Appl. No. 15/084,361 dated Nov. 27, 2018, 21 pages.
Office Action for U.S. Appl. No. 15/084,361 dated Sep. 27, 2017, 18 pages.
Office Action for U.S. Appl. No. 15/084,361 dated Sep. 20, 2019, 22 pages.
Office Action for U.S. Appl. No. 15/198,977 dated Jun. 27, 2018, 12 pages.
Office Action for U.S. Appl. No. 15/198,977 dated May 3, 2017, 10 pages.
Office Action for U.S. Appl. No. 15/198,977 dated Sep. 17, 2019, 13 pages.
Office Action for U.S. Appl. No. 15/491,699 dated Aug. 7, 2019, 7 pages.
Restriction Requirement for U.S. Appl. No. 14/929,160 dated Aug. 29, 2017, 5 pages.
Restriction Requirement for U.S. Appl. No. 14/929,160 dated Apr. 24, 2018, 5 pages.
Restriction Requirement for U.S. Appl. No. 15/198,977 dated Dec. 29, 2016, 6 pages.
Restriction Requirement for U.S. Appl. No. 15/491,699 dated Aug. 1, 2018, 8 pages.
Advisory Action for U.S. Appl. No. 16/933,853 dated Jul. 21, 2022, 6 pages.
Advisory Action for U.S. Appl. No. 16/942,678 dated Jun. 17, 2022, 4 pages.
KIPO Office Action (Translation) dated Oct. 14, 2015 for Korean Patent Application No. 10-2015-0024448, 3-pages.
KIPO Office Action dated Oct. 14, 2015 for Korean Patent Application No. 10-2015-0024448, 4-pages.
Office Action for U.S. Appl. No. 17/682,749 dated Jul. 21, 2022, 44 pages.
Office Action for U.S. Appl. No. 17/682,818 dated Aug. 16, 2022, 41 pages.
Dube, Marc A. et al., "The Effect of Polymer Microstructure and Thermal Post-Treatment on Latex-Based Pressure Sensitive Adhesive Performance," Macromol. Symp., vol. 324, 2013, pp. 49-54.
Rui, Qi et al., "Progress in pressure sensitive adhesives for the optical filters of the flat-panel displays," Modern Chemical Industry, Dec. 2012, pp. 32-36.
US Final Office Action dated Dec. 8, 2022, issued in U.S. Appl. No. 17/682,818 (45 pages).
US Office Action dated Feb. 9, 2023, issued in U.S. Appl. No. 16/942,678 (10 pages).
US Final Office Action dated Feb. 27, 2023, issued in U.S. Appl. No. 17/682,749 (48 pages).
US Advisory Action dated Mar. 16, 2023, issued in U.S. Appl. No. 17/682,818 (6 pages).
Nagase America, Version 2.0, 2010 (Year: 2010).
US Office Action dated May 25, 2023, issued in U.S. Appl. No. 16/942,678 (10 pages).
Aldrich, "Reference: Polymer Properties", pp. 52-53, date accessed: Sep. 1, 2023 <https://www3.nd.edu/-hgao/thermal_transitions_of_homopolymers.pdf> (Year: 2023).
US Final Office Action dated Sep. 7, 2023, issued in U.S. Appl. No. 16/942,678 (10 pages).
US Office Action dated Nov. 20, 2023, issued in U.S. Appl. No. 17/682,749 (40 pages).
US Office Action dated Nov. 20, 2023, issued in U.S. Appl. No. 17/682,818 (27 pages).
US Final Office Action dated Mar. 20, 2024, issued in U.S. Appl. No. 17/682,749 (39 pages).
US Final Office Action dated Mar. 20, 2024, issued in US Patent application No. 17/682, 818 (27 pages).

* cited by examiner

ADHESIVE FILM AND DISPLAY MEMBER COMPRISING THE SAME

CROSS-REFERENCE TO RELATED APPLICATIONS

This application is a divisional of U.S. application Ser. No. 15/198,977, filed on Jun. 30, 2016, which claims priority to and the benefit of Korean Patent Application No. 10-2015-0093811, filed on Jun. 30, 2015 in the Korean Intellectual Property Office, the entire content of each of which is incorporated herein by reference.

BACKGROUND

1. Field

Aspects of embodiments of the present invention relate to an adhesive film and a display member including the same.

2. Description of the Related Art

Recently, an optical display such as a liquid crystal display and an organic light emitting diode display may be characterized by a glass substrate or a high hardness film. To this end, flexible displays capable of being folded and unfolded are being developed in the art. Such flexible displays employ a film as a substrate and thus are not only thin and light, but also exhibit high impact resistance. In addition, the flexible displays can be folded and unfolded and thus can be manufactured into various shapes.

The flexible display has a stack structure in which a window film is stacked on a display member. An optically clear adhesive (OCA) film is interposed between the display member and the window film.

Recently, along with harsher environments of using, storing and/or manufacturing optical displays and an increasing interest in flexible optical displays and the like, various properties are required of adhesive films for flexible displays. In particular, for application to flexible displays, there is a need for an OCA film capable of maintaining viscoelasticity in a wide temperature range while exhibiting good reliability even after a number of folding cycles.

One example of a background technique is disclosed in JP Patent Application No. 2007-176542.

SUMMARY

In accordance with an aspect of one or more embodiments of the present invention, an adhesive film is formed of an adhesive composition including: a copolymer of a monomer mixture including a hydroxyl group-containing (meth)acrylate and a comonomer; and nanoparticles, wherein the adhesive film has a creep at −20° C. of about 50 μm to about 100 μm and a gel fraction of about 50% to about 75%.

In accordance with another aspect of one or more embodiments of the present invention, an adhesive film is formed of an adhesive composition including: a copolymer of a monomer mixture including a hydroxyl group-containing (meth)acrylate and a comonomer; and nanoparticles, wherein the adhesive film has a creep at −20° C. of about 50 μm to about 100 μm and a storage modulus at −20° C. of about 30 kPa to about 100 kPa.

In accordance with a further aspect of one or more embodiments of the present invention, a display member includes an optical film and the adhesive film attached to one or both surfaces of the optical film.

DETAILED DESCRIPTION

As used herein, the term "(meth)acrylate" may refer to acrylates and/or methacrylates.

As used herein, the term "copolymer" may include oligomers, polymers, and resins.

As used herein, the term "comonomer" refers to a monomer capable of being polymerized with a hydroxyl group-containing (meth)acrylate, and may be any monomer so long as the monomer can be polymerized with a hydroxyl group-containing (meth)acrylate.

As used herein, the term "foldability" refers to a property allowing an adhesive film to be repeatedly folded and unfolded, and good foldability means that there is no failure even after about 100,000 cycles of folding and unfolding the adhesive film (one cycle refers to an operation of folding the adhesive film in half once and unfolding the adhesive film back).

As used herein, the term "creep" means a pushed distance, as measured by the following method: a glass substrate (about 30 mm×about 50 mm) and a PET film (polyethylene terephthalate, about 15 mm×about 50 mm) are coupled to each other via an adhesive film (about 15 mm×about 15 mm) interposed therebetween such that one side of the adhesive film is placed at one end of the PET film and the other side of the adhesive film is placed at the middle of a 30 mm edge of the glass substrate, thereby preparing a sample. Then, with one end of the sample secured to a TA (TA.XT Plus Texture Analyzer (Stable Micro System Co., Ltd.)), the sample is pulled by a force of 500 gf at 0.01 mm/min for about 1,000 sec.

Figure 2A:
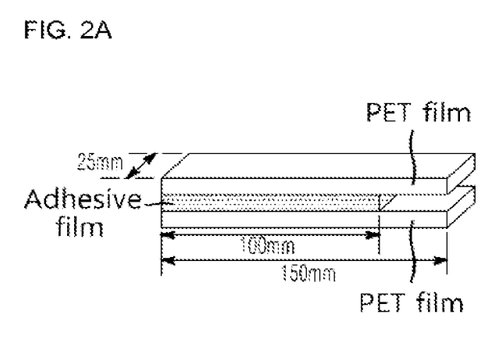
FIGS. 2A and 2B are schematic diagrams of a specimen for measuring T-peel strength.
Figure 2B:
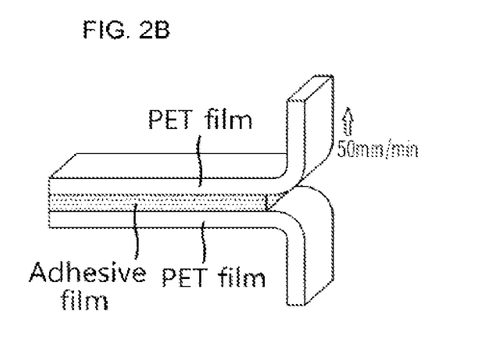

As used herein, the term "T-peel strength with respect to a corona-treated polyethylene terephthalate (PET) film" means a value measured by the following procedures i) to v):

i) An adhesive composition is coated onto a polyethylene terephthalate (PET) release film, followed by UV irradiation at a dose of 2,000 mJ/cm$^2$, thereby producing an about 100 μm thick adhesive sheet of an adhesive film and the PET film;

ii) A pair of PET films, each of which has a size of about 150 mm×about 25 mm×about 75 μm (length×width×thickness) and is subjected to corona treatment twice (total dose: 156) under corona discharge at a dose of 78 using a corona treatment device, is prepared;

iii) An adhesive film sample having a size of about 100 mm×about 25 mm×about 100 μm (length×width×thickness) is obtained from the adhesive sheet, followed by laminating the corona-treated surfaces of the PET films onto both surfaces of the adhesive film sample, thereby preparing a specimen, as shown in FIG. 2A;

iv) The specimen is subjected to autoclaving under conditions of about 3.5 bar and about 50° C. for about 1,000 seconds and secured to a TA.XT_Plus texture analyzer (Stable Micro System Co., Ltd.); and v) In the TA.XT_Plus texture analyzer, the PET film at one side is kept fixed and the PET film at the other side is pulled at a rate of 50 mm/min in order to measure T-peel strength (see FIG. 2B).

As used herein, the term "average particle diameter of nanoparticles" refers to a z-average particle diameter of the nanoparticles, as measured in a water-based or organic solvent using a Zetasizer nano-ZS (Malvern Co., Ltd.).

As used herein, the term "core-shell structure" may mean a typical core-shell structure. In addition, each of the core and the shell may be composed of a single layer or multiple layers, and the term "outermost layer" refers to the outermost layer among several layers.

In accordance with an aspect of one or more embodiments of the present invention, an adhesive film is formed of an adhesive composition including: a copolymer of a monomer mixture including a hydroxyl group-containing (meth)acrylate and a comonomer; and nanoparticles.

Hereinafter, the adhesive composition according to one or more embodiments of the present invention will be described in further detail.

The copolymer of the monomer mixture is a copolymer of the monomer mixture that includes the hydroxyl group-containing (meth)acrylate and the comonomer.

The hydroxyl group-containing (meth)acrylate may be a $C_1$ to $C_{20}$ alkyl group-containing (meth)acrylic acid ester having at least one hydroxyl group, a $C_5$ to $C_{20}$ cycloalkyl group-containing (meth)acrylic acid ester having at least one hydroxyl group, or a $C_6$ to $C_{20}$ aryl group-containing (meth)acrylic acid ester having at least one hydroxyl group.

In an embodiment, for example, the hydroxyl group-containing (meth)acrylate may include at least one of 2-hydroxyethyl (meth)acrylate, 4-hydroxybutyl (meth)acrylate, 2-hydroxypropyl (meth)acrylate, 2-hydroxybutyl (meth)acrylate, and 6-hydroxyhexyl (meth)acrylate, without being limited thereto. In an embodiment, the hydroxyl group-containing (meth)acrylate may be a $C_1$ to $C_5$ alkyl group-containing (meth)acrylic monomer having a hydroxyl group, whereby the adhesive composition can have further improved adhesion.

The hydroxyl group-containing (meth)acrylate may be present in an amount of about 10 percent by weight (wt %) to about 40 wt %, and, in one embodiment, about 13 wt % to about 30 wt %, and, in one embodiment, about 15 wt % to about 25 wt %, in the monomer mixture. Within this range, the adhesive film exhibits good properties in terms of adhesion, foldability, and reliability.

The comonomer is a monomer capable of reacting with a hydroxyl group-containing (meth)acrylate, and may be any monomer without limitation so long as the monomer can react with a hydroxyl group-containing (meth)acrylate.

The comonomer may include at least one of alkyl (meth)acrylate monomers, ethylene oxide-containing monomers, propylene oxide-containing monomers, amine group-containing monomers, amide group-containing monomers, alkoxy group-containing monomers, phosphoric acid group-containing monomers, sulfonic acid group-containing monomers, phenyl group-containing monomers, and silane group-containing monomers, without being limited thereto.

The alkyl (meth)acrylate monomer may include an unsubstituted $C_1$ to $C_{20}$ linear or branched alkyl (meth)acrylic ester. In an embodiment, for example, the alkyl (meth)acrylate monomer may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, iso-octyl (meth)acrylate, nonyl (meth)acrylate, decyl (meth)acrylate, and lauryl (meth)acrylate. In an embodiment, a $C_4$ to $C_8$ alkyl acrylic monomer is used as the alkyl (meth)acrylate monomer, thereby further improving initial adhesive strength of the adhesive composition.

The ethylene oxide-containing monomer may include at least one ethylene oxide group ($—CH_2CH_2O—$)-containing (meth)acrylate monomer. In an embodiment, for example, the ethylene oxide-containing monomer may include any of polyethylene oxide alkyl ether (meth)acrylates such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, and polyethylene oxide mono-tert-butyl ether (meth)acrylate, without being limited thereto.

The propylene oxide-containing monomer may include any of polypropylene oxide alkyl ether (meth)acrylates such as polypropylene oxide monomethyl ether (meth)acrylate, polypropylene oxide monoethyl ether (meth)acrylate, polypropylene oxide monopropyl ether (meth)acrylate, polypropylene oxide monobutyl ether (meth)acrylate, polypropylene oxide monopentyl ether (meth)acrylate, polypropylene oxide dimethyl ether (meth)acrylate, polypropylene oxide diethyl ether (meth)acrylate, polypropylene oxide monoisopropyl ether (meth)acrylate, polypropylene oxide monoisobutyl ether (meth)acrylate, and polypropylene oxide mono-tert-butyl ether (meth)acrylate, without being limited thereto.

The amino group-containing monomer may include any of amino group-containing (meth)acrylic monomers such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, and methacryloxyethyltrimethyl ammonium chloride (meth)acrylate, without being limited thereto.

The amide group-containing monomer may include any of amide group-containing (meth)acrylic monomers such as (meth)acrylamide, N-methyl acrylamide, N-methyl methacrylamide, N-methylol (meth)acrylamide, N-methoxymethyl (meth)acrylamide, N,N-methylene bis(meth)acrylamide, and 2-hydroxyethyl acrylamide, without being limited thereto.

The alkoxy group-containing monomer may include any of 2-methoxyethyl (meth)acrylate, 2-methoxypropyl (meth)acrylate, 2-ethoxypropyl (meth)acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, and 3-butoxyhexyl (meth)acrylate, without being limited thereto.

The phosphoric acid group-containing monomer may include any of phosphoric acid group-containing acrylic monomers such as 2-methacryloyloxyethyldiphenylphosphate (meth)acrylate, trimethacryloyloxyethylphosphate (meth)acrylate, and triacryloyloxyethylphosphate (meth)acrylate, without being limited thereto.

The sulfonic acid group-containing monomer may include any of sulfonic acid group-containing acrylic monomers such as sodium sulfopropyl (meth)acrylate, sodium 2-sulfoethyl (meth)acrylate, and sodium 2-acrylamido-2-methylpropane sulfonate, without being limited thereto.

The phenyl group-containing monomer may include any of phenyl group-containing acrylic vinyl monomers such as p-tert-butylphenyl (meth)acrylate and o-biphenyl (meth) acrylate, without being limited thereto.

The silane group-containing monomer may include any of silane group-containing vinyl monomers such as 2-acetoacetoxyethyl (meth)acrylate, vinyltrimethoxysilane, vinyltriethoxysilane, vinyl tris(β-methoxyethyl)silane, vinyltriacetylsilane, and methacryloyloxypropyltrimethoxysilane, without being limited thereto.

The comonomer may be present in an amount of about 60 wt % to about 90 wt %, and, in one embodiment, about 70 wt % to about 87 wt %, and, in one embodiment, about 75 wt % to about 85 wt %, in the monomer mixture. Within this range, the adhesive film exhibits good properties in terms of adhesion, foldability, and reliability.

In an embodiment, the comonomer may have a glass transition temperature (Tg) of about −150° C. to about 0° C. Here, the glass transition temperature can be measured, for example, on a homopolymer of each measurement target monomer using a DSC Q20 (TA Instrument Inc.). A homopolymer of each monomer is heated to about 100° C. at a rate of about 10° C./min, maintained at about 100° C. for about 5 minutes, slowly cooled to about −180° C. at a rate of about 10° C./min, and maintained at about −180° C. for about 10 minutes. Then, the homopolymer of each monomer is heated from about −180° C. to about 160° C. at a rate of about 10° C./min in order to obtain data of an endothermic transition curve. An inflection point of the endothermic transition curve is determined as the glass transition temperature. The comonomer having a glass transition temperature (Tg) of about −150° C. to about 0° C. may be any comonomer without limitation so long as the comonomer has a glass transition temperature (Tg) of about −150° C. to about 0° C. In an embodiment, the comonomer may be a comonomer having a glass transition temperature (Tg) of about −150° C. to about −20° C., and, in one embodiment, a comonomer having a glass transition temperature (Tg) of about −150° C. to about −40° C.

In another embodiment, the comonomer may include at least one of alkyl (meth)acrylate monomers, ethylene oxide-containing monomers, propylene oxide-containing monomers, amine group-containing monomers, amide group-containing monomers, alkoxy group-containing monomers, phosphoric acid group-containing monomers, sulfonic acid group-containing monomers, phenyl group-containing monomers, and silane group-containing monomers, which have a glass transition temperature (Tg) of about −150° C. to about 0° C.

Examples of the comonomer may include at least one of alkyl (meth)acrylate monomers including methyl acrylate, ethyl acrylate, isopropyl acrylate, n-butyl acrylate, iso-butyl acrylate, hexyl (meth)acrylate, heptyl (meth)acrylate, 2-ethylhexyl acrylate, dodecyl (meth)acrylate, and the like; alkylene oxide-containing (meth)acrylate monomers including polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, and the like; amino group-containing (meth)acrylate monomers including monomethylaminoethyl (meth)acrylate, monoethylaminoethyl (meth)acrylate, monomethylaminopropyl (meth)acrylate, monoethylaminopropyl (meth)acrylate, and the like; alkoxy group-containing (meth)acrylate monomers including 2-methoxyethyl (meth)acrylate, 2-methoxypropyl (meth) acrylate, 2-ethoxypropyl (meth)acrylate, and the like; and silane group-containing (meth)acrylate monomers including 2-acetoacetoxyethyl (meth)acrylate, vinyltrimethoxysilane, vinyltriethoxysilane, and the like.

In another embodiment, the copolymer of the monomer mixture may be a copolymer of the monomer mixture including the hydroxyl group-containing (meth)acrylate and the comonomer having a glass transition temperature (Tg) of about −150° C. to about 0° C. In this embodiment, the comonomer having a glass transition temperature (Tg) of about −150° C. to about 0° C. may be present in an amount of about 60 wt % to about 90 wt %, and, in one embodiment, about 70 wt % to about 90 wt %, in the monomer mixture. Within this range, the adhesive film exhibits good adhesion and reliability. The hydroxyl group-containing (meth)acrylate may be present in an amount of about 10 wt % to about 40 wt %, and, in one embodiment, about 10 wt % to about 30 wt %, in the monomer mixture. Within this range, the adhesive film has low haze and good adhesion.

In another embodiment, the monomer mixture may further include a carboxyl group-containing monomer.

The carboxyl group-containing monomer may include (meth)acrylic acid, 2-carboxyethyl (meth)acrylate, 3-carboxypropyl (meth)acrylate, 4-carboxybutyl (meth)acrylate, itaconic acid, crotonic acid, maleic acid, fumaric acid, and maleic anhydride, without being limited thereto.

The carboxyl group-containing monomer may be present in an amount of about 5 wt % or less, and, in one embodiment, about 3 wt % or less, and, in one embodiment, about 1 wt % or less, in the monomer mixture. Within this range, the adhesive film exhibits good adhesion and reliability.

The adhesive composition includes the nanoparticles. The adhesive film formed of the adhesive composition according to the present invention exhibits good low temperature and/or room temperature viscoelasticity, thereby securing good foldability. In addition, the adhesive composition including the nanoparticles can exhibit stable high temperature viscoelasticity due to a cross-linked structure thereof. In some embodiments, the nanoparticles can form a chemical bond with the copolymer.

Although the adhesive composition includes the nanoparticles, the nanoparticles have a specific average particle size and there is a specific difference in index of refraction between the nanoparticles and the copolymer, thereby securing good transparency.

The nanoparticles may have an average particle diameter of about 5 nm to about 400 nm, and, in one embodiment, about 10 nm to about 300 nm, and, in one embodiment, about 10 nm to about 250 nm. Within this range, agglomeration of the nanoparticles can be prevented or substantially prevented and the adhesive film exhibits good transparency.

A difference in index of refraction between the nanoparticles and the copolymer may be about 0.03 or less, and, in one embodiment, about 0 to about 0.03, and, in one embodiment, from about 0 to about 0.02. Within this range, the adhesive film exhibits good transparency.

The nanoparticles may have a core-shell structure, and the core and the shell may have a glass transition temperature satisfying Equation 1:

$$Tg(c) < Tg(s), \hspace{2em} \text{[Equation 1]}$$

where $Tg(c)$ is a glass transition temperature (° C.) of the core, and $Tg(s)$ is a glass transition temperature (° C.) of the shell.

The core may have a glass transition temperature (Tg) of about −200° C. to about 10° C., and, in one embodiment, about −200° C. to about −5° C., and, in one embodiment, about −200° C. to about −20° C. Within this range, the adhesive film can realize storage modulus required at low temperature (−20° C.) and exhibits good low temperature and/or room temperature viscoelasticity.

The core may include at least one of a polyalkyl (meth) acrylate having a glass transition temperature of about −150° C. to about 10° C. and a polysiloxane having a glass transition temperature of about −200° C. to about −40° C.

Examples of polyalkyl (meth)acrylates having a glass transition temperature of about −150° C. to about 10° C. may include at least one of polymethyl acrylate, polyethyl acrylate, polypropyl acrylate, polybutyl acrylate, polyisopropyl acrylate, polyhexyl acrylate, polyhexyl methacrylate, polyethylhexyl acrylate, and polyethylhexyl methacrylate, without being limited thereto. The core may include at least one of polybutyl acrylate and polyethylhexyl acrylate.

The polysiloxane having a glass transition temperature (Tg) of about −200° C. to about −40° C. may be an organosiloxane (co)polymer. The organosiloxane (co)polymer may be a non-crosslinked or crosslinked organosiloxane (co)polymer. The crosslinked organosiloxane (co)polymer may be used to secure impact resistance and colorability. The crosslinked organosiloxane (co)polymer may include crosslinked dimethylsiloxane, methylphenylsiloxane, diphenylsiloxane, and mixtures thereof. With a copolymer of two or more organosiloxanes, the nanoparticles can have an index of refraction in the range of about 1.41 to about 1.50.

A crosslinked state of the organosiloxane (co)polymer may be determined based on a degree of dissolution in various organic solvents. As the degree of crosslinking of the organosiloxane (co)polymer is increased, the degree of dissolution of the organosiloxane (co)polymer is lowered. A solvent for determination of the crosslinked state may include acetone, toluene, and the like. In an embodiment, the organosiloxane (co)polymer may have a moiety which is not dissolved in acetone or toluene. The organosiloxane copolymer may include about 30% or more of insolubles in toluene.

The organosiloxane (co)polymer may further include an alkyl acrylate crosslinked polymer. The alkyl acrylate crosslinked polymer may include any of methyl acrylate, ethyl acrylate, n-butyl acrylate, 2-ethylhexyl acrylate, and the like. In an embodiment, for example, the alkyl acrylate crosslinked polymer may be n-butyl acrylate or 2-ethylhexyl acrylate having a low glass transition temperature.

The shell may have a glass transition temperature (Tg) of about 15° C. to about 150° C., and, in one embodiment, about 35° C. to about 150° C., and, in one embodiment, about 50° C. to about 140° C. Within this range, the nanoparticles exhibit good dispersibility.

The shell may include any of polyalkyl (meth)acrylates having a glass transition temperature (Tg) of about 15° C. to about 150° C. In an embodiment, for example, the shell may include at least one of poly(methyl methacrylate) (PMMA), polyethyl methacrylate, polypropyl methacrylate, polybutyl methacrylate, polyisopropyl methacrylate, polyisobutyl methacrylate and polycyclohexyl methacrylate, without being limited thereto. In an embodiment, the shell may include poly(methyl methacrylate).

In some embodiments, the nanoparticles may include the core and the shell in a weight ratio of about 1:1 to about 9:1. Within this range, the adhesive film maintains viscoelasticity in a wide temperature range and exhibits good foldability. In some embodiments, the core or the shell may include two or more layers, and an outermost layer of the nanoparticles may include at least one of polyalkyl (meth)acrylates having a glass transition temperature of about 15° C. to about 150° C.

The nanoparticles may be present in an amount of about 0.1 parts by weight to about 10 parts by weight, and, in one embodiment, about 0.1 parts by weight to about 8 parts by weight, and, in one embodiment, about 0.1 parts by weight to about 7 parts by weight, and, in one embodiment, about 0.1 parts by weight to about 5 parts by weight, relative to 100 parts by weight of the monomer mixture including the hydroxyl group-containing (meth)acrylate and the comonomer. Within this range, the adhesive film has balance between viscoelasticity, storage modulus, and recovery rate.

In one embodiment, the nanoparticles included in the adhesive composition may be used in a state of being polymerized with the monomer mixture in preparation of the copolymer of the monomer mixture. In this embodiment, the nanoparticles may be used in a state of being included in the copolymer of the monomer mixture.

In another embodiment, the adhesive composition may include the copolymer of the monomer mixture in a prepared state and the nanoparticles. In this embodiment, the nanoparticles may be included in the adhesive composition separately from the copolymer of the monomer mixture.

The copolymer of the monomer mixture may have a glass transition temperature of about −150° C. to about −13° C., and, in one embodiment, about −100° C. to about −20° C. Within this range, the adhesive film exhibits good adhesion in a wide temperature range and good reliability while exhibiting good foldability.

The adhesive composition may further include at least one of a crosslinking agent and an initiator.

The initiator may be a photopolymerization initiator or a thermal polymerization initiator.

The initiator may be an initiator which is the same as or different from the initiator used in the preparation of the hydroxyl group-containing (meth)acrylic copolymer. In another embodiment, the initiator may be a thermal polymerization initiator.

The photopolymerization initiator may be any initiator so long as the initiator can realize a second crosslinking structure by deriving polymerization of the radical polymerizable compound during curing through light irradiation. For example, the photopolymerization initiator may include any of benzoin, hydroxyl ketone, amino ketone, phosphine oxide photoinitiators, and the like. In an embodiment, the photopolymerization initiator may include any of benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-bis(diethyl)aminobenzophenone, dichlorobenzophenone, 2-methylanthraquinone, 2-ethylanthraquinone, 2-t-butylanthraquinone, 2-am inoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic acid ester, oligo[2-hydroxy-2-methyl-1-[4-(1-methylvinyl)phenyl]propanone], and 2,4,6-trimethylbenzoyl-diphenyl-phosphine oxide, without being limited thereto. These photopolymerization initiators may be used alone or in combination thereof.

The thermal polymerization initiator may be any initiator, for example, azo, peroxide, and redox compounds, so long as the initiator can realize the second crosslinking structure. For example, the thermal polymerization initiator may include typical initiators. Examples of the azo compound may include 2,2-azobis(2-methylbutyronitrile), 2,2-azobis (isobutyronitrile), 2,2-azobis(2,4-dimethylvaleronitrile), 2,2-azobis-2-hydroxymethylpropionitrile, dimethyl-2,2-methylazobis(2-methylpropionate), and 2,2-azobis(4-methoxy-2,4-dimethylvaleronitrile). Examples of the peroxide compound may include: inorganic peroxides such as potassium perchlorate, ammonium persulfate and hydrogen peroxide; and organic peroxides such as diacylperoxide, peroxydicarbonate, peroxyester, tetramethylbutyl peroxyneodecanoate, bis(4-butylcyclohexyl)peroxydicarbonate, di(2-ethylhexyl)peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, t-butyl peroxy neoheptanoate, amyl peroxypivalate, t-butyl peroxypivalate, t-amyl peroxy-2-ethylhexanoate, lauroyl peroxide, dilauroyl peroxide, di(dodecanoyl) peroxide, benzoyl peroxide, and dibenzoyl peroxide, without being limited thereto. Examples of the redox compound may include mixtures of a peroxide compound and a reductant, without being limited thereto. These azo, peroxide, and redox compounds may be used alone or in combination thereof.

The initiator may be present in an amount of about 0.001 parts by weight to about 5 parts by weight, and, in one embodiment, about 0.003 parts by weight to about 3 parts by weight, and, in one embodiment, about 0.1 parts by weight to about 1 part by weight, relative to 100 parts by weight of the monomer mixture. Within this range, the initiator allows complete curing of the adhesive composition, can prevent or substantially prevent deterioration in transmittance of the adhesive composition due to a residual initiator, can reduce bubble generation in the adhesive composition, and can exhibit good reactivity.

In an embodiment, the crosslinking agent is a polyfunctional (meth)acrylate. Examples of the polyfunctional (meth)acrylate may include: bifunctional acrylates such as 1,4-butanediol di(meth)acrylate, 1,6-hexanediol di(meth) acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, and 9,9-bis[4-(2-acryloyloxyethoxy)phenyl] fluorine; trifunctional acrylates such as trimethylolpropane tri(meth) acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylates, tris(meth)acryloxyethylisocyanurate; tetrafunctional acrylates such as diglycerin tetra(meth)acrylate and pentaerythritol tetra(meth)acrylate; pentafunctional acrylates such as dipentaerythritol penta(meth)acrylate; and hexafunctional acrylates such as dipentaerythritol hexa(meth) acrylate, caprolactone-modified dipentaerythritol hexa(meth)acrylate, and urethane (meth)acrylates (for example, reaction products of an isocyanate monomer and trimethylolpropane tri(meth)acrylate), without being limited thereto. These crosslinking agents may be used alone or in combination thereof. In an embodiment, the crosslinking agent may be a polyfunctional (meth)acrylate of a polyhydric alcohol containing 2 to 20 hydroxyl groups to provide good durability.

The crosslinking agent may be present in an amount of about 0.01 parts by weight to about 5 parts by weight, and, in one embodiment, about 0.03 parts by weight to about 3 parts by weight, and, in one embodiment, about 0.1 parts by weight to about 0.3 parts by weight, relative to 100 parts by weight of the monomer mixture. Within this range, the adhesive film exhibits good adhesion and improved reliability.

The adhesive composition may further include a silane coupling agent.

The silane coupling agent may include any of siloxane and epoxy silane coupling agents, without being limited thereto. The silane coupling agent may be present in an amount of about 0.01 parts by weight to about 5 parts by weight, and, in one embodiment, about 0.01 parts by weight to about 2 parts by weight, and, in one embodiment, about 0.01 parts by weight to about 0.5 parts by weight, relative to 100 parts by weight of the monomer mixture. Within this range, the adhesive film has improved reliability.

In one or more embodiments, the adhesive composition may further include any of typical additives, such as curing accelerators, ionic liquids, lithium salts, inorganic fillers, softeners, molecular weight regulators, antioxidants, anti-aging agents, stabilizers, adhesion-imparting resins, reforming resins (polyol, phenol, acrylic, polyester, polyolefin, epoxy, epoxidized polybutadiene resins, and the like), leveling agents, defoamers, plasticizers, dyes, pigments (coloring pigments, extender pigments, and the like), UV blocking agents, fluorescent whitening agents, dispersants, heat stabilizers, photostabilizers, UV absorbers, antistatic agents, coagulants, lubricants, solvents, and the like.

The adhesive composition may further include a non-curable compound.

In an embodiment, the adhesive composition may not include a solvent and may have a viscosity at 25° C. of about 300 cPs to about 50,000 cPs. Since the adhesive composition does not include a solvent, the adhesive composition can have improved reliability by suppressing bubble generation. Within this range, the adhesive composition can have good coatability and thickness uniformity.

The adhesive film according to one or more embodiments of the present invention may be formed of the adhesive composition as described above. Next, the adhesive film according to the present invention will be further described.

In one embodiment, a mixture including the monomer mixture of the hydroxyl group-containing (meth)acrylate and the comonomer (for example, a comonomer having a glass transition temperature (Tg) of about −150° C. to about 0° C.) (selectively, a carboxylic group-containing monomer) and the nanoparticles may be polymerized, thereby preparing a copolymer. Alternatively, a prepolymer may be prepared through partial polymerization of the monomer mixture, followed by introducing the nanoparticles into the prepolymer, thereby preparing the copolymer of the monomer mixture. The adhesive composition may be prepared by mixing the initiator and the crosslinking agent with the prepared copolymer, followed by UV curing of the adhesive composition, thereby providing an adhesive film.

In an embodiment, the adhesive composition, which may be prepared by mixing and polymerizing the monomer mixture, the nanoparticles and the photopolymerization initiator, followed by adding an additional photopolymerization initiator to the polymer, may be coated onto a release film, followed by curing, thereby producing the adhesive film. Curing may be performed by irradiation at a wavelength of about 300 nm to about 400 nm at a dose of about 400 mJ/cm$^2$ to about 1,500 mJ/cm$^2$ under oxygen-free conditions using a low-pressure lamp. A coating thickness of the adhesive composition may range from about 10 μm to about 2 mm, and, in one embodiment, from about 20 μm to about 1.5 mm, without being limited thereto.

The adhesive film may be used as a transparent adhesive film, or may be formed on an optical film to be used as an adhesive optical film.

The adhesive film may have a thickness of about 2 μm to about 10 mm, and, in one embodiment, about 1 μm to about 50 mm, and, in one embodiment, about 50 μm to about 300 μm. Within this range, the adhesive film can be used in a display member.

In one embodiment, the adhesive film may have a creep at −20° C. of about 50 μm to about 100 μm and a gel fraction of about 50% to about 75%. Within these ranges, the adhesive film exhibits good properties in terms of foldability, transparency, adhesive strength, and reliability (bubble generation area) under severe conditions.

In another embodiment, the adhesive film may have a creep at −20° C. of about 50 μm to about 100 μm and a storage modulus at −20° C. of about 30 kPa to about 100 kPa. Within these ranges, the adhesive film exhibits good properties in terms of foldability, transparency, adhesive strength, and reliability (bubble generation area) under severe conditions.

The adhesive film may have a creep at −20° C. of about 50 μm, 51 μm, 52 μm, 53 μm, 54 μm, 55 μm, 56 μm, 57 μm, 58 μm, 59 μm, 60 μm, 61 μm, 62 μm, 63 μm, 64 μm, 65 μm, 66 μm, 67 μm, 68 μm, 69 μm, 70 μm, 71 μm, 72 μm, 73 μm, 74 μm, 75 μm, 76 μm, 77 μm, 78 μm, 79 μm, 80 μm, 81 μm, 82 μm, 83 μm, 84 μm, 85 μm, 86 μm, 87 μm, 88 μm, 89 μm, 90 μm, 91 μm, 92 μm, 93 μm, 94 μm, 95 μm, 96 μm, 97 μm, 98 μm, 99 μm, or 100 μm. Further, the adhesive film may have a creep at −20° C. in a range from one of the numerical values set forth above to another numerical value set forth above. For example, the adhesive film may have a creep at −20° C. of about 50 μm to about 100 μm, and, in one embodiment, about 55 μm to about 95 μm, and, in one embodiment, about 55 μm to about 90 μm. Within this range, the adhesive film has good properties in terms of foldability and reliability.

The adhesive film may have a creep at 25° C. of about 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, or 350 μm. Further, the adhesive film may have a creep at 25° C. in a range from one of the numerical values set forth above to another numerical value set forth above. For example, the adhesive film may have a creep at 25° C. of about 60 μm to about 350 μm, and, in one embodiment, about 80 μm to about 330 μm, and, in one embodiment, about 120 μm to about 325 μm. Within this range, the adhesive film has good properties in terms of foldability and reliability.

The adhesive film may have a gel fraction of about 50%, 51%, 52%, 53%, 54%, 55%, 56%, 57%, 58%, 59%, 60%, 81%, 62%, 63%, 64%, 65%, 66%, 67%, 68%, 69%, 70%, 71%, 72%, 73%, 74%, or 75%. Further, the adhesive film may have a gel fraction in a range from one of the numerical values set forth above to another numerical value set forth above. For example, the adhesive film may have a gel fraction of about 50% to about 75%, and, in one embodiment, about 55% to about 75%, and, in one embodiment, about 58% to about 73%. Within this range, the adhesive film has good foldability.

The gel fraction can be obtained by Equation 2:

$$\text{Gel fraction (\%)} = (W3 - W1)/(W2 - W1) \times 100, \quad \text{[Equation 2]}$$

where W1 is the weight of a wire mesh (230 mesh); W2 is the total weight of the wire mesh and an adhesive film, which is obtained by irradiating the adhesive composition with UV light (wavelength: 350 nm) at an irradiance of about 50 mW/cm$^2$ to a dose of 2,000 mJ so as to form a film and leaving the film at 35° C. and 45% RH for 1 hour, and then is placed on the wire mesh; and W3 is the total weight of the wire mesh and an adhesive film, which is obtained by irradiating the adhesive composition with UV light (wavelength: 350 nm) at an irradiance of about 50 mW/cm$^2$ to a dose of 2,000 mJ so as to form a film and leaving the film at 35° C. and 45% RH for 1 hour, is placed on the wire mesh and received together with the wire mesh in a sample bottle, followed by adding ethyl acetate to the sample bottle, and then is left at 25° C. for 1 day, followed by drying at 150° C. for 1 hour.

The adhesive film may have a storage modulus at −20° C. of about 30 kPa to about 100 kPa, and, in one embodiment, about 30 kPa to about 95 kPa, and, in one embodiment, about 50 kPa to about 75 kPa. Within this range, the adhesive film exhibits viscoelasticity, even at low temperature, and good foldability.

The adhesive film may have a storage modulus at 25° C. of about 10 kPa to about 100 kPa, and, in one embodiment, about 10 kPa to about 50 kPa, and, in one embodiment, about 15 kPa to about 40 kPa. Within this range, the adhesive film exhibits viscoelasticity at room temperature and good foldability.

The adhesive film may have a storage modulus at 80° C. of about 10 kPa to about 100 kPa, and, in one embodiment, about 10 kPa to about 40 kPa, and, in one embodiment, about 10 kPa to about 35 kPa. Within this range, since the adhesive film does not suffer from whitening due to flexibility thereof when used in a flexible device at high temperature, the adhesive film can be used in optical materials.

The adhesive film may have a ratio of storage modulus at −20° C. to storage modulus at 25° C. in a range from about 1:1 to about 4:1, and, in one embodiment, from about 1:1 to about 3:1, and, in one embodiment, from about 1:1 to about 2.4:1. Within this range, the adhesive film exhibits good adhesion between the adhesive film and an adherend and can be used in flexible optical members.

In another embodiment, the adhesive film may have a difference of about 55 kPa or less, and, in one embodiment, about 35 kPa to about 52 kPa, between storage modulus at −20° C. and storage modulus at 80° C.

The adhesive film may have a T-peel strength (herein, a corona bonding strength) of about 400 gf/in, 500 gf/in, 600 gf/in, 700 gf/in, 800 gf/in, 900 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, 3000 gf/in, 3100 gf/in, 3200 gf/in, 3300 gf/in, 3400 gf/in, 3500 gf/in, 3600 gf/in, 3700 gf/in, 3800 gf/in, 3900 gf/in, or 4000 gf/in with respect to a corona-treated PET film at 25° C. Further, the adhesive film may have a T-peel strength in a range from one of the numerical values set forth above to another numerical value set forth above with respect to the corona-treated PET film at 25° C. For example, the adhesive film may have a T-peel strength of about 400 gf/in to about 4,000 gf/in with respect to the corona-treated PET film at 25° C. In an embodiment, the adhesive film may have a T-peel strength of about 500 gf/in to about 3,700 gf/in, and, in one embodiment, about 700 gf/in to about 3,500 gf/in with respect to the corona-treated PET film at room temperature (25° C.). Within this range, the adhesive film exhibits good adhesion and reliability at room temperature.

The adhesive film may have a T-peel strength of about 200 gf/in, 300 gf/in, 400 gf/in, 500 gf/in, 600 gf/in, 700 gf/in, 800 gf/in, 900 gf/in, 1000 gf/in, 1100 gf/in, 1200 gf/in, 1300 gf/in, 1400 gf/in, 1500 gf/in, 1600 gf/in, 1700 gf/in, 1800 gf/in, 1900 gf/in, 2000 gf/in, 2100 gf/in, 2200 gf/in, 2300 gf/in, 2400 gf/in, 2500 gf/in, 2600 gf/in, 2700 gf/in, 2800 gf/in, 2900 gf/in, or 3000 gf/in with respect to a corona-treated PET film at 60° C. Further, the adhesive film may have a T-peel strength in a range from one of the numerical values set forth above to another numerical value set forth above with respect to the corona-treated PET film at 60° C. For example, the adhesive film may have a T-peel strength of about 200 gf/in to about 3,000 gf/in with respect to a corona-treated PET film at 60° C. In an embodiment, the adhesive film may have a T-peel strength of about 500 gf/in to about 2,000 gf/in, and, in one embodiment, about 500 gf/in to about 1,500 gf/in with respect to the corona-treated PET film at 60° C. Within this range, the adhesive film exhibits good adhesion and reliability at high temperature.

The adhesive film may have a bubble generation area of about 0%, as measured on a specimen of the adhesive film obtained by stacking an about 50 μm thick PET film on one surface of the adhesive film (about 13 cm×about 3 cm, thickness: about 100 μm) and stacking an about 100 μm thick PET film on the other surface of the adhesive film. Within this range, the adhesive film exhibits good adhesion and can be used in flexible displays.

The "bubble generation area" refers to a value (%) measured on an adhesive film specimen obtained by transferring an adhesive film (about 13 cm×about 3 cm, and thickness of about 100 μm) to an about 50 μm thick PET film, followed by bonding an about 100 μm thick PET film to the other surface thereof. The adhesive film specimen is bent towards the 50 μm thick PET film such that the length of the adhesive film specimen is halved and is then placed between parallel frames having a gap of about 1 cm, and is subjected to aging at about 70° C. and about 93% RH for about 24 hours, followed by analyzing an image, which is obtained through observation of portions of the adhesive film specimen suffering from bubbles using an optical microscope (EX-51, Olympus Co., Ltd., magnification: 30×), using Mac-View software (Mountech Co., Ltd.) to measure a ratio of area occupied by bubbles to area of the adhesive film specimen.

The adhesive film having a thickness of about 100 μm may have a haze of about 5% or less, and, in one embodiment, about 3% or less, and, in one embodiment, about 1% or less. Within this range, the adhesive film exhibits excellent transparency when used in a display member.

In an embodiment, the adhesive film may have a glass transition temperature (Tg) of about −35° C. to about −60° C., and, in one embodiment, about −38° C. to about −60° C., and, in one embodiment, about −39° C. to about −55° C. Within this range, the adhesive film exhibits good properties in terms of foldability and reliability. The glass transition temperature (Tg) may be measured, for example, on a homopolymer of each measurement target monomer using a DSC Q20 (TA Instrument Inc.). Specifically, a homopolymer of each monomer is heated to about 100° C. at a rate of about 10° C./min, maintained at about 100° C. for about 5 minutes, slowly cooled to about −80° C. at a rate of about 10° C./min, and maintained at about −80° C. for about 10 minutes. Then, the homopolymer of each monomer is heated from about −80° C. to about 160° C. at a rate of about 10° C./min in order to obtain data of an endothermic transition curve. An inflection point of the endothermic transition curve is determined as the glass transition temperature.

Another aspect of embodiments of the present invention relates to a display member including the adhesive film. Next, the display member according to an embodiment of the present invention will be described.

The display member may include an optical film and the adhesive film attached to one or both surfaces of the optical film.

Figure 1:
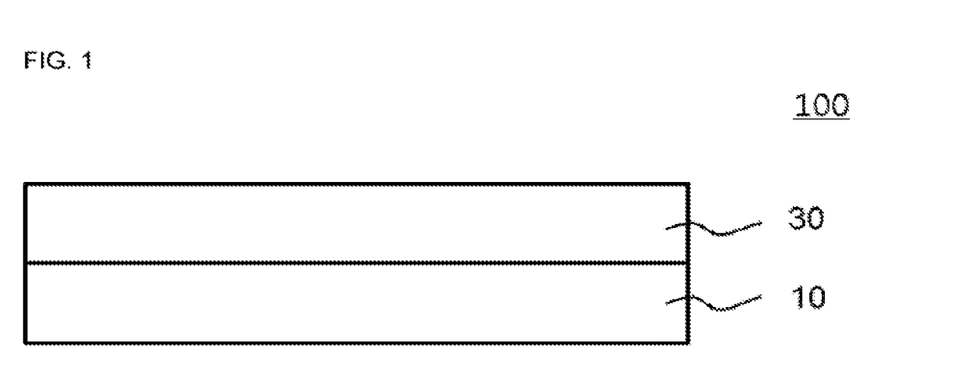
FIG. 1 is a sectional view of a display member according to an embodiment of the present invention.

FIG. 1 is a sectional view of a display member according to an embodiment of the present invention.

Referring to FIG. 1, a display member 100 according to an embodiment may include an optical film 10 and an adhesive film 30 attached to a surface of the optical film 10. Although not shown in the drawings, the display member may include the adhesive films 30 attached to both surfaces of the optical film 10.

The adhesive film 30 may be an adhesive layer attached to one or both surfaces of the optical film 10 and may be used in attaching glass, substrates, electrodes of touch panels, LCD/OLED modules, touch panels, optical films, and the like to each other.

Examples of the optical film 10 may include touch panels, windows, polarizing plates, color filters, retardation films, elliptical polarizing films, reflective polarizing films, anti-reflective films, compensation films, brightness improving films, alignment films, light diffusion films, glass shatter-proof films, surface protective films, OLED device barrier layers, plastic LCD substrates, transparent electrode films such as indium tin oxide (ITO)-containing films, fluorinated tin oxide (FTO)-containing films, aluminum-doped zinc oxide (AZO)-containing films, carbon nanotube-containing films, Ag nanowire-containing films, graphene-containing films, and the like. The optical film can be easily manufactured by those of ordinary skill in the art.

For example, a touch panel may be attached to a window film or an optical film via the adhesive film, thereby forming a display member. Alternatively, the adhesive film may be applied to typical polarizing plates as in the related art. The display member may include a capacitive mobile phone as an optical display.

In one embodiment, the display member may include a first adhesive film, a touch functional unit, a second adhesive film, and a window film sequentially stacked on an optical device in this order.

The optical device may include an organic light emitting diode (OLED), a light emitting diode (LED), a quantum dot light emitting diode (QLED), or a light source, and at least one of the first or second adhesive film may be the adhesive film according to the present invention. The touch functional unit may be a touch panel, without being limited thereto.

In an embodiment, the window film may be formed of an optically transparent flexible resin. For example, the window film may include a base layer and a hard coating layer.

The base layer may be formed of at least one of polyester resins such as polyethylene terephthalate, polyethylene naphthalate, polybutylene terephthalate and polybutylene naphthalate; polycarbonate resins; polyimide resins; polystyrene resins; and poly(meth)acrylate resins such as poly(methyl methacrylate).

The hard coating layer may have a pencil hardness of about 6H or higher and may be specifically formed of a siloxane resin.

In another embodiment, the display member may include: a liquid crystal panel in which polarizers are stacked on both surfaces of an LCD cell; a double-sided adhesive tape (DAT) for bonding functional films (for example, anti-reflective films); and a touch panel unit formed on the functional films. The touch panel unit may include: a first adhesive film; a first transparent electrode film stacked on the first adhesive film; a second adhesive film; and a second transparent electrode film. An electrode and an overcoating layer for the electrode are formed on the second transparent electrode film, and a third adhesive film and a window glass are stacked on the overcoating layer in order. An air gap may be removed upon lamination.

Hereinafter, the present invention will be explained in more detail with reference to some examples. It should be understood that these examples are provided for illustration only and are not to be construed in any way as limiting the present invention.

A description of details apparent to those skilled in the art will be omitted for clarity.

EXAMPLES

Components of adhesive compositions used in Examples and Comparative Examples are as follows.

(A) Hydroxyl group-containing (meth)acrylate (a1) 2-hydroxyethyl acrylate (available from Osaka Chemical Co. Ltd.)

(a2) 4-hydroxybutyl acrylate (available from Osaka Chemical Co. Ltd.)

(B) Comonomer: 2-ethylhexyl acrylate (available from LG Chemical Co., Ltd.)

(C) Nanoparticles: Nanoparticles having a core-shell structure composed of a core of polybutyl acrylate (PBA) and a shell of poly(methyl methacrylate) (PMMA), and having a weight ratio of the core to the shell of 7:3, an average particle diameter of 180 nm, and an index of refraction ($N_B$) of 1.47.

Example 1

1 part by weight of the nanoparticles (C) and 0.04 parts by weight of a photopolymerization initiator (Irgacure 651, 2,2-dimethoxy-2-phenylacetophenone, Chiba Japan K.K) were sufficiently mixed with 100 parts by weight of a monomer mixture comprising 17 wt % of 4-hydroxybutyl acrylate (a2) and 83 wt % of 2-ethylhexyl acrylate (B) in a glass container. Dissolved oxygen in the glass container was purged using nitrogen gas, followed by partially polymerizing the mixture through UV irradiation using a low-pressure lamp (50 mW/cm$^2$, wavelength: 350 nm, BL lamp, Samkyo Co., Ltd.), thereby obtaining a viscous copolymer having a viscosity of about 9,000 cPs. 0.1 parts by weight of a silane coupling agent (KMB-403) and 0.3 parts by weight of a photopolymerization initiator (Irgacure 184) were added to the copolymer, thereby preparing an adhesive composition.

The prepared adhesive composition was coated onto a polyester film (release film, polyethylene terephthalate film, thickness: 50 μm) to form a 100 μm thick adhesive film. An upper side of the adhesive film was covered with a 75 μm thick release film, followed by irradiating both surfaces of the adhesive film using a low-pressure lamp (BL lamp, Samkyo Co., Ltd.) for about 6 minutes, thereby obtaining a transparent adhesive sheet.

Example 2 and Comparative Examples 1 and 2

Adhesive sheets were produced in the same manner as in Example 1 except that the amount of each of the components in Example 1 was changed as listed in Table 1.

The transparent adhesive sheets prepared in the Examples and Comparative Examples were evaluated as to the properties as listed in Table 1. Results are shown in Table 1.

Evaluation of Properties (1) Creep: A glass substrate (about 30 mm×about 50 mm) and a PET film (polyethylene terephthalate, about 15 mm×about 50 mm) were coupled to each other via an adhesive film (about 15 mm×about 15 mm) interposed therebetween such that one side of the adhesive film is placed at one end of the PET film and the other side of the adhesive film is placed at the middle of a 30 mm edge of the glass substrate, thereby preparing a sample. With one end of the sample secured to a TA (TA.XT Plus Texture Analyzer (Stable Micro System Co., Ltd.)), the sample was pulled by a force of 500 gf at 0.01 mm/min for 1,000 sec to measure a pushed distance of the adhesive film at a certain temperature.

(2) Gel fraction (%): Gel fraction can be obtained by Equation 2:

$$\text{Gel fraction (\%)}=(W3-W1)/(W2-W1)\times 100, \quad \text{[Equation 2]}$$

where W1 is the weight of a wire mesh (200 mesh); W2 is the total weight of the wire mesh and an adhesive film, which is obtained by irradiating the adhesive composition with UV light (wavelength: 350 nm) at an irradiance of about 50 mW/cm$^2$ to a dose of 2,000 mJ so as to form a film and leaving the film at 35° C. and 45% RH for 1 hour, and then is placed on the wire mesh; and W3 is the total weight of the wire mesh and an adhesive film, which is obtained by irradiating the adhesive composition with UV light (wavelength: 350 nm) at an irradiance of about 50 mW/cm$^2$ to a dose of 2,000 mJ so as to form a film and leaving the film at 35° C. and 45% RH for 1 hour, is placed on the wire mesh and received together with the wire mesh in a sample bottle, followed by adding ethyl acetate to the sample bottle, and then is left at 25° C. for 1 day, followed by drying at 150° C. for 1 hour. The iron mesh had a size of 200-mesh.

(3) Storage modulus (kPa): Viscoelasticity was measured at a shear rate of 1 rad/sec and a strain of 1% under auto-strain conditions using a dynamic viscoelasticity instrument ARES (MCR-501, Anton Paar Co., Ltd.). After removal of a release film, the pressure-sensitive adhesive sheet was stacked to a thickness of 500 μm, followed by punching the stack structure using an 8 mm diameter puncher, thereby preparing a specimen. Storage modulus was measured on the specimen at a temperature of −60° C. to 90° C. at 5° C./min and storage modulus at each of −20° C., 25° C. and 80° C. was recorded.

(4) T-peel strength with respect to corona-treated polyethylene terephthalate (PET) film: A PET film having a size of about 150 mm×about 25 mm×about 75 μm (length×width×thickness) was subjected to corona treatment twice (total dose: 156) under corona discharge at a dose of 78 using a corona treatment device. An adhesive film sample having a size of about 100 mm×about 25 mm×about 100 μm (length×width×thickness) was obtained from each of the adhesive sheets prepared in the Examples and Comparative Examples. The corona-treated surfaces of the PET films were laminated on both surfaces of the adhesive film sample, thereby preparing a specimen, as shown in FIG. 2A. The specimen was subjected to autoclaving under conditions of about 3.5 bar and about 50° C. for about 1,000 seconds and secured to a TA.XT_Plus texture analyzer (Stable Micro System Co., Ltd.). Referring to FIG. 2B, with the PET film at one side fixed to the TA.XT_Plus Texture Analyzer at 25° C., T-peel strength at 25° C. was measured by pulling the other side of the PET film at 50 mm/min (see FIG. 2B). Further, with the PET film at one side fixed to the TA.XT_Plus Texture Analyzer at 60° C., T-peel strength at 60° C. was measured by pulling the other side of the PET film at 50 mm/min (see FIG. 2B).

(5) Glass transition temperature (Tg, ° C.): Glass transition temperature was measured using a DSC Q20 (TA Instrument). For example, the specimen was heated to about 100° C. at a rate of about 10° C./min, maintained at about 100° C. for about 5 minutes, slowly cooled to about −80° C. at a rate of about 10° C./min, and maintained at about −80° C. for about 10 minutes. Then, the homopolymer of each monomer was heated from about −80° C. to about 160° C. at a rate of about 10° C./min in order to obtain data of an endothermic transition curve. An inflection point of the endothermic transition curve was determined as the glass transition temperature.

(6) Folding cycle: A module having a structure of a window film/adhesive film (size: 100 mm×160 mm, thickness: 50 μm)/transparent electrode deposited PC film and polarizer/adhesive film (Size: 100 mm×160 mm, thickness: 100 μm)/OLED panel (100 μm) was fabricated using the adhesive films. A maximum folding cycle before cracking of the module was measured (one folding cycle refers to an operation of folding the adhesive film in half once and unfolding the adhesive film back). The components of the module were as follows.

OLED panel: A PET film (thickness: 100 μm) was used.

First adhesive film: A 100 μm thick adhesive film formed of the adhesive composition prepared in the Examples or Comparative Examples was used.

Transparent electrode-deposited PC film (touch function unit): A film prepared by depositing a silver nanowire-containing solution (Clearohm-A G4-05, Cambrios Co., Ltd.) onto a 50 μm thick PC film (Teijin Chemical Co., Ltd.) was used.

Polarizer (iodine dyed PVA resin): An 80 μm thick polyvinyl alcohol film (degree of saponification: 99.5, degree of polymerization: 2,000) was dipped in a 0.3% iodine solution in order to perform dyeing and stretched to an elongation of 5.0 in the machine direction. The stretched polyvinyl alcohol film was dipped in a 3% boric acid solution and a 2% potassium iodide solution in order to perform color correction, followed by drying at 50° C. for 4 minutes, thereby preparing a 25 μm thick polarizer.

Second adhesive film: A 50 μm thick adhesive film formed of the adhesive composition prepared in the Examples or Comparative Examples was used.

Window film: A PET film (thickness: 100 μm, 100 μm Cosmoshine TA015, Toyobo Co., Ltd.) was used.

TABLE 1

| | | | Example | | Comparative Example | |
|---|---|---|---|---|---|---|
| | | | 1 | 2 | 1 | 2 |
| (A) | (a1) | | — | — | 35 | 20 |
| | (a2) | | 17 | 20 | — | — |
| (B) | | | 83 | 80 | 65 | 80 |
| (C) | | | 1 | 1 | — | — |
| Creep (μm) | | −20° C. | 75 | 63 | 15 | 20 |
| | | 25° C. | 323 | 285 | 60 | 104 |
| Gel fraction (%) | | | 63 | 65 | 68 | 63 |
| Storage modulus (kPa) | | −20° C. | 56 | 67 | 100 | 80 |
| | | 25° C. | 23 | 25 | 40 | 28 |
| | | 80° C. | 13 | 15 | 35 | 18 |
| T-peel strength with respect to corona treated PET film (gf/in) | | 25° C. | 1310 | 1540 | 780 | 640 |
| | | 60° C. | 730 | 890 | 440 | 360 |
| Glass transition temperature (Tg, ° C.) | | | −53 | −50 | −35 | −45 |
| Folding cycle | | −20° C. | 100,000 or more | 100,000 or more | Less than 100 | Less than 100 |
| | | 25° C. | 100,000 or more | 100,000 or more | 100,000 or more | 100,000 or more |

As can be seen from Table 1, the adhesive films of the Examples exhibited excellent properties in terms of foldability, transparency, and adhesive strength. Conversely, the adhesive films of the Comparative Examples failed to exhibit such properties.

Some example embodiments have been disclosed herein, and although specific terms are employed, such terms are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used alone or in combination with features, characteristics, and/or elements described in connection with other embodiments unless specifically indicated otherwise. Accordingly, it is to be understood by those of skill in the art that various changes in form and detail may be made without departing from the spirit and scope of the present invention as set forth in the following claims.

What is claimed is:

1. An adhesive film formed of a cured adhesive composition comprising: a copolymer of a monomer mixture comprising a hydroxyl group-containing (meth)acrylate and a comonomer; and nanoparticles, wherein the adhesive film has a creep at −20° C. of about 50 μm to about 100 μm and a storage modulus at −20° C. of about 30 kPa to about 100 kPa, wherein the nanoparticles have an average particle diameter of about 5 nm to about 400 nm, and wherein the nanoparticles are present in an amount of about 0.1 parts by weight to about 10 parts by weight relative to 100 parts by weight of the monomer mixture,.

wherein the hydroxyl group-containing (meth)acrylate is a $C_1$ to $C_{20}$ alkyl group-containing (meth)acrylic acid ester having at least one hydroxyl group, a $C_5$ to $C_{20}$ cycloalkyl group-containing (meth)acrylic acid ester having at least one hydroxyl group, or a $C_6$ to $C_{20}$ aryl group-containing (meth)acrylic acid ester having at least one hydroxyl group, and the comonomer includes at least one of alkyl (meth)acrylate monomers, ethylene oxide-containing monomers, propylene oxide-containing monomers, amine group-containing monomers, amide group-containing monomers, alkoxy group-containing monomers, phosphoric acid group-containing monomers, sulfonic acid group-containing monomers, phenyl group-containing monomers, or silane group-containing monomers.

2. The adhesive film according to claim 1, wherein the hydroxyl group- containing (meth)acrylate is present in an amount of about 10 wt % to about 40 wt % in the monomer mixture.

3. The adhesive film according to claim 1, wherein the adhesive film has a creep of about 60 μm to about 350 μm at 25° C.

4. The adhesive film according to claim 1,
wherein the adhesive film has a T-peel strength of about 400 gf/in to about 4,000 gf/in with respect to a corona-treated PET film at 25° C., and
wherein the adhesive film has a T-peel strength of about 200 gf/in to about 3,000 gf/in with respect to a corona-treated PET film at 60° C.

5. The adhesive film according to claim 1,
wherein the adhesive film has a storage modulus of about 10 kPa to about 100 kPa at 25° C., and
wherein the adhesive film has a storage modulus of about 10 kPa to about 100 kPa at 80° C.

6. The adhesive film according to claim 1, wherein the adhesive film has a ratio of storage modulus at −20° C. to storage modulus at 25° C. of about 1:1 to 4:1.

7. The adhesive film according to claim 1, wherein the adhesive film has a difference of about 55 kPa or less between storage modulus at −20° C. and storage modulus at 80° C.

8. The adhesive film according to claim 1, wherein the adhesive film has a glass transition temperature (Tg) of about −35° C. to about −60° C.

9. The adhesive film according to claim 1, wherein the adhesive film has a haze of about 5% or less at a thickness of 100 μm.

10. A display member comprising:
an optical film; and
the adhesive film according to claim 1 attached to one or both surfaces of the optical film.

11. The adhesive film according to claim 1, wherein
the hydroxyl group-containing (meth)acrylate includes at least one of 2-hydroxyethyl (meth)acrylate, 4-hydroxybutyl (meth)acrylate, 2-hydroxypropyl (meth)acrylate, 2-hydroxybutyl (meth)acrylate, and 6-hydroxyhexyl (meth)acrylate; and
the comonomer includes at least one of alkyl (meth)acrylate monomers including methyl acrylate, ethyl acrylate, isopropyl acrylate, n-butyl acrylate, iso-butyl acrylate, hexyl (meth)acrylate, heptyl (meth)acrylate, 2-ethylhexyl acrylate, dodecyl (meth)acrylate, polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polypropylene oxide monomethyl ether (meth)acrylate, polypropylene oxide monoethyl ether (meth)acrylate, polypropylene oxide monopropyl ether (meth)acrylate, monomethylaminoethyl (meth)acrylate, monoethylaminoethyl (meth)acrylate, monomethylaminopropyl (meth)acrylate, monoethylaminopropyl (meth)acrylate, 2-methoxyethyl (meth)acrylate, 2-methoxypropyl (meth)acrylate, 2-ethoxypropyl (meth)acrylate, 2-acetoacetoxyethyl (meth)acrylate, vinyltrimethoxysilane, or vinyltriethoxysilane.

* * * * *